(12) United States Patent  
Blair et al.

(10) Patent No.: US 7,487,226 B2
(45) Date of Patent: Feb. 3, 2009

(54) SYSTEM AND METHOD FOR TRANSFERRING DIGITAL CONTENT ON A MEMORY CARD

(75) Inventors: Barbara Alaine Blair, Boise, ID (US); James Vernard Browning, Boise, ID (US); Mark W. Minne, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 861 days.

(21) Appl. No.: 10/632,071

(22) Filed: Jul. 31, 2003

(65) Prior Publication Data

US 2005/0086320 A1    Apr. 21, 2005

(51) Int. Cl.
G06F 15/16 (2006.01)

(52) U.S. Cl. .................. 709/219; 709/217; 709/218
(58) Field of Classification Search ................ 709/217, 709/219

See application file for complete search history.

(56) References Cited

U.S. PATENT DOCUMENTS

| | | | |
|---|---|---|---|
| 5,363,203 A | | 11/1994 | Tahara et al. |
| 5,539,450 A | | 7/1996 | Handelman |
| 5,631,701 A | | 5/1997 | Miyake |
| 5,648,816 A | | 7/1997 | Wakui |
| 5,809,246 A | * | 9/1998 | Goldman ................... 709/217 |
| 5,861,918 A | | 1/1999 | Anderson et al. |
| 5,900,608 A | * | 5/1999 | Iida ............................. 235/381 |
| 5,926,624 A | * | 7/1999 | Katz et al. ................... 709/217 |
| 5,949,411 A | * | 9/1999 | Doerr et al. .................. 709/219 |
| 5,974,004 A | * | 10/1999 | Dockes et al. ............... 715/727 |
| 6,295,555 B1 | * | 9/2001 | Goldman ..................... 709/219 |
| 6,317,779 B1 | * | 11/2001 | Gile et al. .................... 709/217 |
| 6,330,490 B1 | * | 12/2001 | Kim et al. .................... 700/234 |
| 6,337,712 B1 | * | 1/2002 | Shiota et al. ............. 348/231.1 |
| D463,395 S | * | 9/2002 | Newcomb et al. .......... D14/173 |
| 6,460,076 B1 | * | 10/2002 | Srinivasan ................... 709/219 |
| 6,496,802 B1 | * | 12/2002 | van Zoest et al. ............. 705/14 |
| 6,622,166 B2 | * | 9/2003 | Gile et al. .................... 709/217 |
| 6,647,417 B1 | * | 11/2003 | Hunter et al. .................. 705/26 |
| 6,900,980 B2 | * | 5/2005 | Christopher ................. 361/683 |
| 6,976,028 B2 | * | 12/2005 | Fenton et al. ................ 707/102 |
| 7,130,251 B1 | * | 10/2006 | Morohashi ................ 369/47.13 |
| 7,166,791 B2 | * | 1/2007 | Robbin et al. ............. 84/477 R |
| 2003/0236716 A1 | * | 12/2003 | Manico et al. ................. 705/27 |
| 2004/0224638 A1 | * | 11/2004 | Fadell et al. ................ 455/66.1 |

* cited by examiner

Primary Examiner—Larry D Donaghue
Assistant Examiner—Jeffrey R Swearingen (57) ABSTRACT

A digital content transfer appliance comprises a memory card reader, a memory, and a controller. The memory card reader is configured to removably receive at least one memory card and to read and write a digital content on the memory card wherein the digital content includes at least one of a digital image file and a digital audio file. The controller is configured for directing transfer of the digital content, independent of a personal computer, via a modem between the memory card and a digital content service provider. The memory is configured for storing the digital image file and the digital audio file.

14 Claims, 5 Drawing Sheets

SYSTEM AND METHOD FOR TRANSFERRING DIGITAL CONTENT ON A MEMORY CARD

BACKGROUND OF THE INVENTION

The advance of technology into the digital age has transformed nearly every facet of our lives. For the consumer, perhaps nothing represents this shift better than entertainment media. We have progressed from analog audio recordings and playback devices, such as a record player and eighttrack cassettes, to digital recordings and playback devices, such as compact disc players. In photography, digital cameras and digital video recorders are now commonplace.

However, with these changes come new problems and new opportunities. For example, a consumer can have digital photos stored on a memory card processed the same way that a roll of film was previously processed at a film processing center. The consumer delivers the memory card to the photo processing center by hand or by mail, and then waits for the processing center to produce the requested photos. While taking the pictures is more convenient, the processing end of the pathway is still slow and requires much human involvement. A consumer also could purchase digital music by buying a compact disc or purchasing music on the internet for downloading onto a memory device such as computer hard drive. However, each of these steps typically requires the interaction of a personal computer.

Accordingly, although the digital age has brought some improvement in the quality of music and photography, most consumers are still burdened with using a personal computer and multiple accessory devices for photo processing of image data from a digital camera and/or downloading digital music files.

SUMMARY OF THE INVENTION

One embodiment of the present invention is a digital content transfer appliance comprising a memory card reader, a memory, and a controller. The memory card reader is configured to removably receive at least one memory card and to read and write a digital content on the memory card wherein the digital content includes at least one of a digital image file and a digital audio file. The controller is configured for directing transfer of the digital content, independent of a personal computer, via a modem between the memory card and a digital content service provider. The memory is configured for storing the digital image file and the digital audio file.

DETAILED DESCRIPTION

In the following detailed description of the preferred embodiments, reference is made to the accompanying drawings which form a part hereof, and in which is shown by way of illustration specific embodiments in which the invention may be practiced.

Components of the present invention may be implemented in hardware via a microprocessor, programmable logic, or state machine, in firmware, or in software within a given device. In one aspect, at least a portion of the software programming is web-based and written in Hyper Text Mark Up Language (HTML) and JAVA programming languages, including links to graphical user interfaces, such as via windows-based operating system. The components may communicate via a network using a communication bus protocol. For example, the present invention may or may not use a Transmission Control Protocol (TCP)/Internet Protocol (IP) protocol suite for data transport. Other programming languages and communication bus protocols suitable for use with the present invention will become apparent to those skilled in the art after reading the present application. Components of the present invention may reside in software on one or more computer-readable media. The term computer-readable media as used herein is defined to include any kind of memory, volatile or non-volatile, such as floppy disks, hard disks, Compact Disc-Read Only Memory (CD-ROMs), flash memory, read-only memory (ROM), and random access memory (RAM) or other suitable memory now known or later developed.

Embodiments of the present invention for transferring digital content on a memory card makes the use of memory cards more convenient and user-friendly. A digital content transfer appliance of the present invention acts as a memory card appliance for handling memory cards without the interaction of a personal computer. With this memory card appliance, the user can insert a memory card into the memory card appliance and then read from, and write to, virtually all memory cards of different types of digital media, such as audio files (e.g., Moving Picture Experts Group Third Layer File (MP3)), photo image files, video image files (e.g., Moving Picture Experts Group File (MPEG)), and multimedia files including combinations of any one or all of audio, text, still photo, video, graphics, as part of the multimedia. Using this memory card appliance, the user can view an interactive menu on a television or other media player to display the contents of the memory card in the appliance and then select the digital content (e.g., images, audio files) to be transferred to and/or from the memory card. Accordingly, this memory card appliance (or digital content transfer appliance) stands alone and independent from a personal computer to enable within a single device nearly universal reading and writing to removably-insertable memory cards of different types and formats for a variety of media (e.g., photo, video, audio, etc.).

Figure 1:
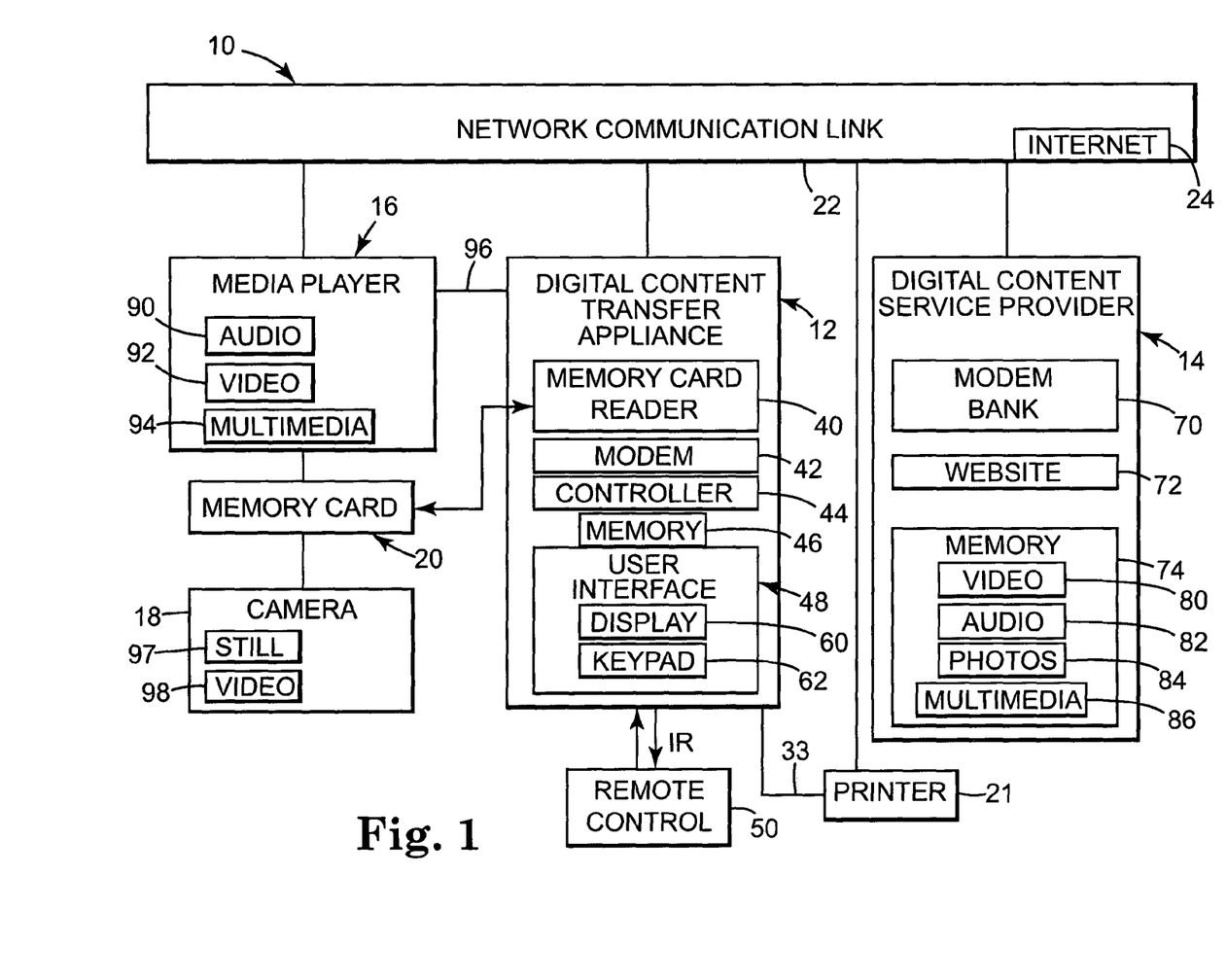
FIG. 1 is a block diagram of a system for transferring digital content, according to an embodiment of the present invention.

In one exemplary embodiment of the present invention, a system 10 for transferring digital content on a memory card is illustrated in FIG. 1. As shown in FIG. 1, system 10 comprises digital content transfer appliance 12, digital content service provider 14, media player 16, camera 18, memory card 20, printer 21, and network communication link 22 with internet link 24.

Digital content transfer appliance 12 comprises memory card reader 40, modem 42, controller 44, memory 46, user interface 48 and optional remote control 50. User interface 48 includes display 60 and keypad 62. Digital content service provider 14 includes modem bank 70, web site 72, and memory 74 including video module 80, audio module 82, photo module 84, and multimedia module 86.

Media player 16 plays and/or displays digital content stored on memory card 20 and includes at least one of audio file module 90 (e.g., MP3 player), video module 92 (e.g., Video Cassette Recorder (VCR)) and multimedia module 94 (e.g., Digital Versatile Disc (DVD)) for playing, recording, and/or copying digital content. Media player 16 also optionally includes a digital video recorder, such as a digital entertainment center, available from Hewlett-Packard of Palo Alto, Calif. Direct link 96 optionally connects digital content transfer appliance 12 directly to media player 16.

Camera 18 includes at least one of electronic still module 97 (e.g., digital still photographic camera) and video module 98 (e.g., digital video motion picture camera). Printer 21 is connected to media player 16, digital content transfer appliance 12, digital content service provider 14, via network communication link 22 and/or direct link 33 for printing digital content.

Digital content transfer appliance 12 governs transfer of digital content to and from removably-insertable memory card 20. Digital content includes any digital media file, such as a digital audio/music file (e.g., MP3 music file), digital image file (e.g., photo file, video file), digital multimedia file (e.g., Windows Media Audio (WMA)), that can be read from or written to digital memory card 20. Memory card reader 40 of digital content transfer appliance 12 includes a read/write mechanism and/or circuitry for reading information from memory card 20 as well as for writing information to memory card 20. Memory card reader 40 receives and holds one or more different types of memory cards 20 (e.g., audio, photo, etc.), as further described in greater detail in association with FIG. 5.

Modem 42 of digital content transfer appliance 12 preferably is a telephone modem, a high-speed cable modem, distributed services line modem (DSL), broadband modem, satellite modem, or other high-speed modem for establishing a connection to communicate with other devices and service providers, such as digital content service provider 14. Modem 42 cooperates as part of, and/or communicates with, network communication link 22 for establishing those connections.

Controller 44 of digital content transfer appliance 12 preferably includes hardware, software, firmware or combination of these. In one preferred embodiment, controller 44 includes a microprocessor-based system capable of performing a sequence and logic operation and including memory for storing information. However, controller 44 is independent from a personal computer. Controller 44 governs the interaction of the components of digital content transfer appliance 12 and in particular, governs the transfer of digital content to and from memory card 20 in memory card reader 40 via modem 42. Controller 44 optionally includes, or has access to, a driver for providing an interactive graphical menu as part of display 60 of user interface 48. The interactive menu preferably is supplied from, and communicates with, digital content service provider 14 via modem 42 as directed by controller 44. The interactive menu is used for directing the transfer of digital content to and from memory card 20 via memory card reader 40 of digital content transfer appliance 12. User interface 48 and display 60 including such an interactive menu is described in further detail in association with at least FIGS. 4, 6, and 7.

Memory 46 of digital content transfer appliance 12 optionally stores audio, video, and/or photo files and preferably includes a high-capacity random access memory system available on an integrated circuit chip, such as Synchronous Dynamic Random Access Memory (SDRAM), Dynamic Random Access Memory (DRAM), Extended Data Output Random Access Memory (EDO), RAM, etc. Memory 46 also optionally comprises a miniaturized hard drive sized for disposition within digital content transfer appliance 12.

Memory 46 optionally is used to supply digital content to, or receive digital content from, digital content service provider 14 when memory card 20 is temporarily unavailable. For example, memory card 20 optionally can transfer its digital content through memory card reader 40 to memory 46 for later transfer from memory 46 to digital content service provider 14. This feature can be used when modem 42 is inoperable, when the user otherwise desires to not immediately transfer digital content to digital content service provider 14, and/or when the user desires to maintain a small library of digital content at digital content transfer appliance 12. Likewise, digital content can be downloaded from digital content service provider 14 to memory 46 of digital content terminal via modem 42 and then be later transferred to memory card 20 via memory card reader 40. This features enables downloading of digital content from digital content service provider 14 to digital content transfer appliance 12 even when memory card 20 is not present so that upon later insertion of memory card 20 into memory card reader 40, the digital content may be transferred directly from memory 46 to memory card 20 via memory card reader 40.

User interface 48 provides keypad 62 for initiating and/or terminating a transfer of digital content as well as for selecting particular digital content for transfer and provides display 60 for indicating the status of the selected transfer. User interface 48 also can provide information about the digital content stored within memory 46 of digital content transfer appliance 12 and/or in memory card 20. User interface 48 is further described in greater detail in association with at least FIGS. 4, 6 and 7.

Optional remote control 50 functions to provide at least some of the functions of user interface 48 and communicates with digital content transfer appliance 12 through a wired or wireless communication protocol, such as infrared, 802.11, UltraWideBand, Bluetooth, as well as other short range wireless communication protocols.

Memory card 20 comprises a digital media memory card such as an audio memory card, photo memory card, multimedia card, DataPlay disk, SmartMedia card, FlashCard, etc and that is removably insertable into a digital media device (e.g., electronic camera 18, media player 16) for use and removably insertable into memory card reader 40 for reading digital content from and writing digital content to memory card 20.

Network communication link 22, as used herein, includes an internet communication link (e.g., the Internet), an intranet communication link, or similar high-speed communication link, as well as telecommunication links such as a phone line. Network communication link 22 is established by either a wired or wireless pathway. In one preferred embodiment, network communication link 22 includes an Internet communication link 24. Network communication link 20 permits communication between digital content transfer appliance 12 and digital content service provider 14, and optionally includes communication with media player 16, as well as printer 21.

Digital content service provider 14 generally facilitates transfer of digital content as a service to the user of digital content transfer appliance 12. For example, digital content service provider 14 can provide a service of downloading audio files or receiving transmitted photo files for photo processing.

Modem bank 70 of digital content service provider 14 enables digital content service provider 14 to communicate via network communication link 22 with a plurality of digital content terminals 12 for transferring digital content between service provider 14 and memory cards 20 via digital content transfer appliance 12. Web site 72 comprises a retail storefront for service provider 14 for customers having digital content transfer appliance 12 to make selections of service from digital content service provider 14. For example, digital content service provider 14 preferably supplies services in providing downloadable audio files such as MP3 music files (e.g., web sites such as PressPlay®, MusicNet®), as well as services in providing photo processing for digital photo files and/or digital video files that have been transmitted to digital content service provider 14 from a customer.

Memory 74 of digital content service provider 14 provides storage for a customer's photos in photo module 84 and for the customer's videos in video module 80 to aid service provider 14 in providing on-going service to the customer having digital content transfer appliance 12. Audio module 82 of memory 74 includes a library of audio files, such as MP3 and WMA files, for selection by customers for downloading a copy onto their memory card 20. Multimedia module 86 includes a library of multimedia files such as Digital Versatile Disc (DVD) movies, as well as any other text, graphics, and combinations of photo, video, and/or audio content.

Figure 2:
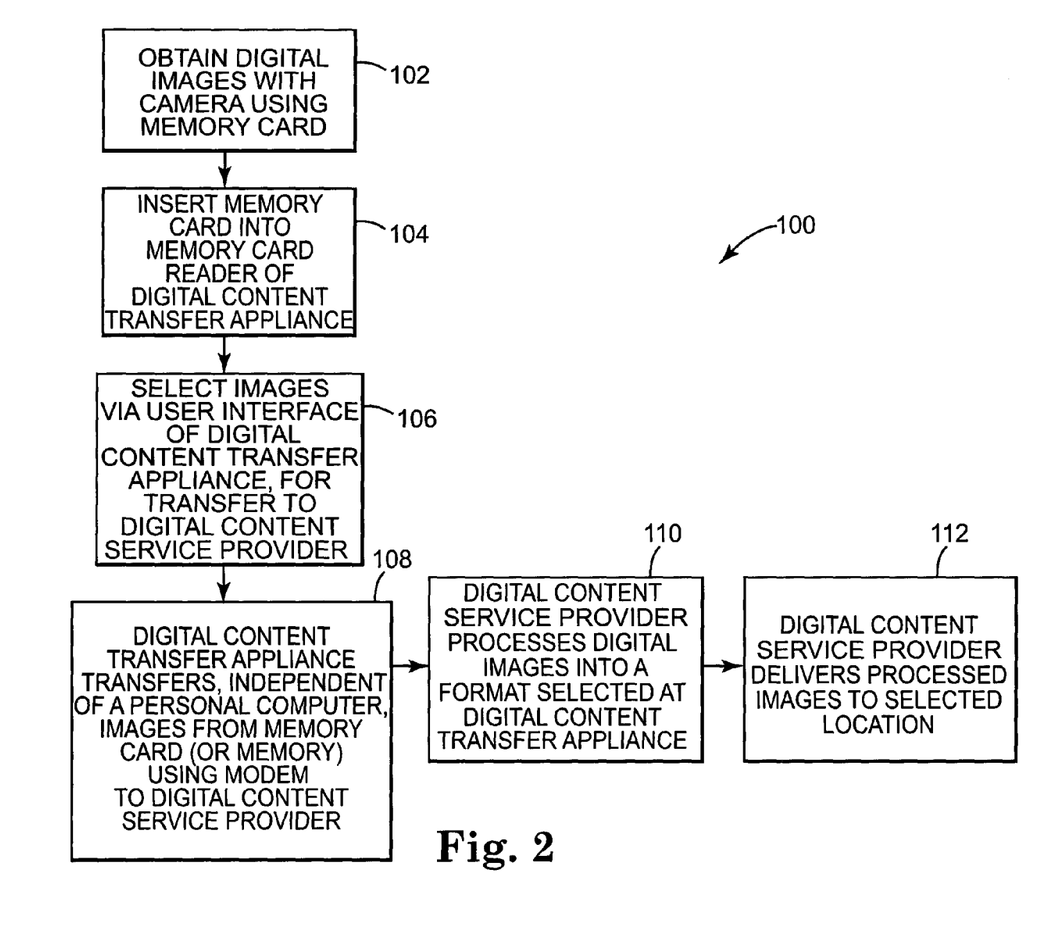
FIG. 2 is flow diagram of a method of transferring digital image files, according to an embodiment of the present invention.

FIG. 2 illustrates an embodiment of method 100 for transferring digital images between memory card 20 and digital content service provider 14 via digital content transfer appliance 12. "Digital images" includes still photos, video (e.g., dynamic and/or moving images), or any combination thereof. As shown in FIG. 2, method 100 begins by obtaining digital images, such as photos and/or digital video with camera 18 using memory card 20 that is removably inserted into camera 18 (See block 102). The digital photos and/or video are recorded onto memory card 20 by camera 18.

After removing memory card 20 from camera 18, memory card 20 is removably inserted into memory card reader 40 of digital content transfer appliance 12 (See block 104). Memory card reader 40 identifies memory card 20 by title, name, date, and/or owner, etc., and identifies which digital photos and/or videos are recorded on memory card 20 (e.g., by date, title, owner, etc.) This information is made available at display 60 of user interface 48 of digital content transfer appliance 12. Insertion of memory card 20 into memory card reader 40 optionally automatically triggers establishing a connection via modem 42 and network communication link 22 between digital content transfer appliance 12 and digital content service provider 14.

Using user interface 48 of digital content transfer appliance 12, a user selects 106 digital images for transfer from memory card 20 to digital content service provider 14 for processing into a selected format (e.g., prints, VHS, Digital Versatile Disc (DVD), etc.) (See block 106). User interface 48 enables a customer to access web site 72 of digital content service provider 14 to make those selections or alternatively includes an interactive menu directly viewable at display 60 of user interface 48 for selecting the desired services available from digital content service provider 14. Items on the menu are selectable with keypad 62 of user interface 48, with display 60 functioning as an active touchscreen, and/or with remote control 50.

At block 108, digital content transfer appliance 12 transfers digital images from memory card 20 (or from memory of camera 18 and/or media player 16) via modem 42 over network communication link 22 to digital content service provider 14. Digital content transfer appliance 12 initiates the transfer immediately after selection by the customer or at a designated time e.g., 2 a.m., so that the phone line or other connection is not occupied during daytime hours. Preferred selections and transfer times are optionally stored in memory 46 or at digital content service provider 14 and triggered upon insertion of memory card 20.

Digital content service provider 14 at block 110 processes the selected digital images into a format identified by the user at digital content transfer appliance 12 (step 106). After processing, digital content service provider 14 delivers processed images to a location selected by a user via digital content transfer appliance 12 (step 112). This delivery includes delivery by electronic mail, standard mail, express mail, etc. The processed images also can be held at web site 72 and stored in memory 74 of digital content service provider 14 for later retrieval by the customer through a selected delivery pathway.

Figure 3:
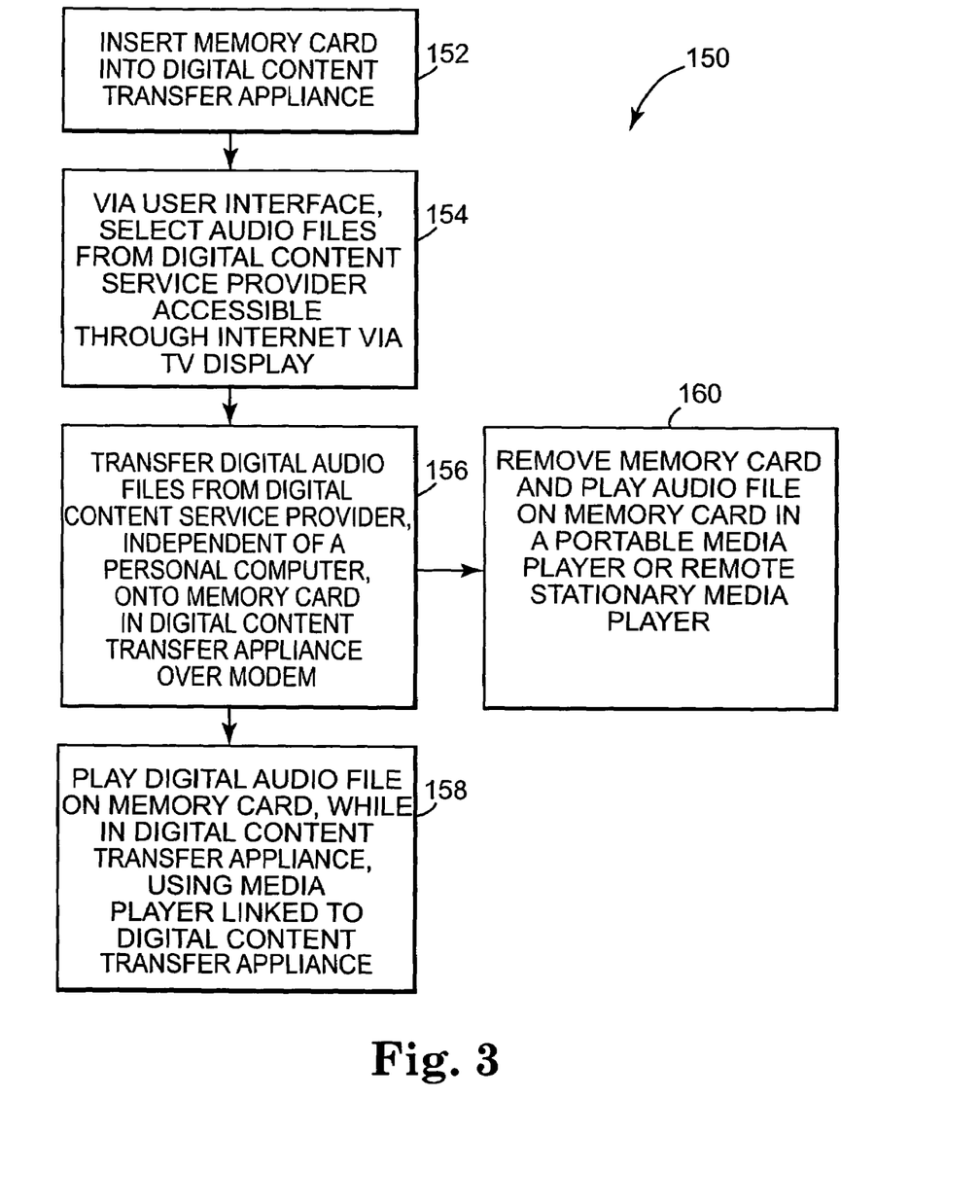
FIG. 3 is a flow diagram of a method of transferring digital audio files, according to an embodiment of the present invention.

FIG. 3 illustrates an embodiment of method 150 for transferring audio digital content between memory card 20 and digital content service provider 14 via digital content transfer appliance 12. Method 150 begins at block 152 by inserting memory card 20 into digital content transfer appliance 12 and selecting an audio file (See block 154), via user interface 48, from digital content service provider 14 for downloading onto memory card 20. Memory card 20 preferably comprises an audio file memory card, such as a MP3 memory card. A menu of selectable audio files is available through an internet service provider and viewable on display 60 of user interface 48 of digital content transfer appliance 12, or media player 16, such as a television. The selection is made via keypad 62 of user interface 48 of digital content transfer appliance 12, via display 60 acting as a touchscreen pointing device, and/or remote control 50.

The selected digital audio files are transferred from digital content service provider 14 onto memory card 20 in memory card reader 40 of digital content transfer appliance 12 over network communication link 22 through modem 42 (See block 156). The transfer is preferably performed at off-peak hours, such as night time when an internet connection or phone line is not ordinarily in use.

After the transfer is complete, the user uses or plays the digital audio file on memory card 20 at block 158, while still in digital content transfer appliance 12, via direct link 96 with media player 16. Alternatively, the user can remove memory card 20 from digital content transfer appliance 12 and play the digital audio file on memory card 20 (at block 160) in a portable media player or remote stationary media player.

Method 100 and method 150 are not mutually exclusive but express different modes in which digital content transfer appliance 12 is used for transferring digital content to and from memory card 20. Audio and image files optionally can be transferred at the same time. Other transfers are also available such as transferring photo and video digital content from digital content service provider 14 (or another digital content transfer appliance 12), to memory card 20 in digital content transfer appliance 12. For example, a user receiving digital content onto their memory card 20 over the modem optionally can download digital content from the digital content service provider where the digital content includes pre-recorded still photo images for purchase (e.g., trademarked or unprotected still images of favorite TV or movie characters, models, sports heroes, etc.), pre-recorded video images for purchase (e.g., music video, movie previews or excerpts), processed still photo images (e.g., photos posted at digital content service provider 14 by the user or by a friend, relative, news agency, etc. for downloading onto memory card 20), processed video images, and pre-recorded audio files for purchase (e.g., music audio files sold by copyrighted music clearinghouses, such as American Society of Composers, Authors, and Publishers (ASCAP), BMG, a division of Bertelsmann AG, or other entertainment media companies, ABC media, SONY, etc.).

Similarly, a digital audio file on memory card 20 in digital content transfer appliance 12 is transferable to another digital content transfer appliance 12 or to digital content service provider 14. Finally, other forms of digital content suitable for storage on memory cards 20, such as graphics, text, combinations of audio, photo and/or video, etc., can be transferred to and from memory card using memory card reader 40 of digital content transfer appliance 12.

Figure 4:
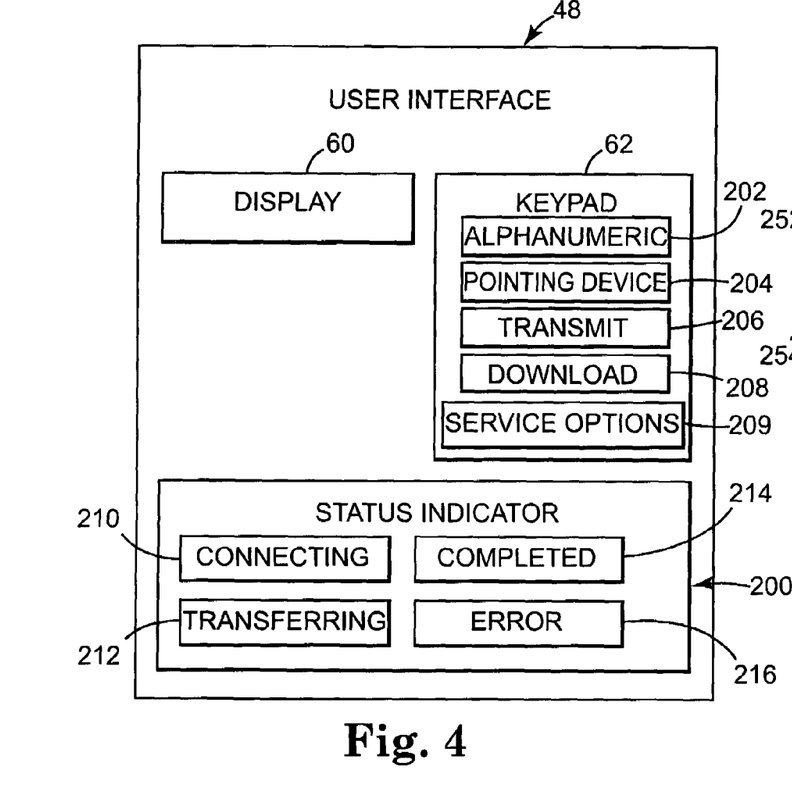
FIG. 4 is a block diagram of an user interface of a digital content terminal, according to an embodiment of the present invention.

FIG. 4 illustrates user interface 48 of digital content transfer appliance 12. User interface 48 includes display 60, keypad 62 and status indicator 200. Display 60 includes a graphical interface for displaying menu selections, selectable functions, as well as images such as photos, videos, audio titles, etc.

Keypad 62 includes at least one of alphanumeric keypad 202, pointing device 204, transmit function 206, download function 208 and service options 209. Alphanumeric module 180 and pointing device 182 facilitate selecting the desired functions, selections for transfer, as well as types of service from digital content service provider 14 including identification of personal and financial information for performing transactions between digital content transfer appliance 12 and digital content service provider 14. Transmit function 206 provides an express method of initiating a transfer of a digital content file from memory card 20 in digital content transfer appliance 12 to digital content service provider 14, or other destination. Similarly, by pressing transmit function 206, the user initiates a one-button transfer of digital content using previously specified parameters of the transfer through digital content transfer appliance 12 and/or digital content service provider 14. Accordingly, the user need not use a graphic user interface 48 each time a transfer is made. Download function 208 provides an express method, independent of graphic user interface 48, of initiating a transfer of a digital content file from digital content service provider 14 (or other destination) to memory card 20 in digital content transfer appliance 12. By pressing download function 208, the user initiates a one-button transfer of digital content using previously specified parameters.

Status indicator 200 includes connecting function 210, transferring function 212, completed function 214, and error function 216. Status indicator 200 identifies the status of any requested transfers and is preferably displayed through a plurality of light emitting diodes (LEDS) or through an interactive menu on display 60. Connecting function 210 identifies that digital content transfer appliance 12 is in the process of establishing a connection with digital content service provider 14 through modem 42 and/or network communication link 22. Transferring function 212 identifies that digital content transfer appliance 12 and digital content service provider 14 are transferring digital content between the two devices, which can either be a transmission from memory card 20 in digital content transfer appliance 12 to digital content service provider 14 or a download from digital service provider 14 to memory card 20 in digital content transfer appliance 12. Completed function 214 identifies that the requested transfer is completed, and error function 216 identifies that an error occurred during the requested transfer.

Figure 5:
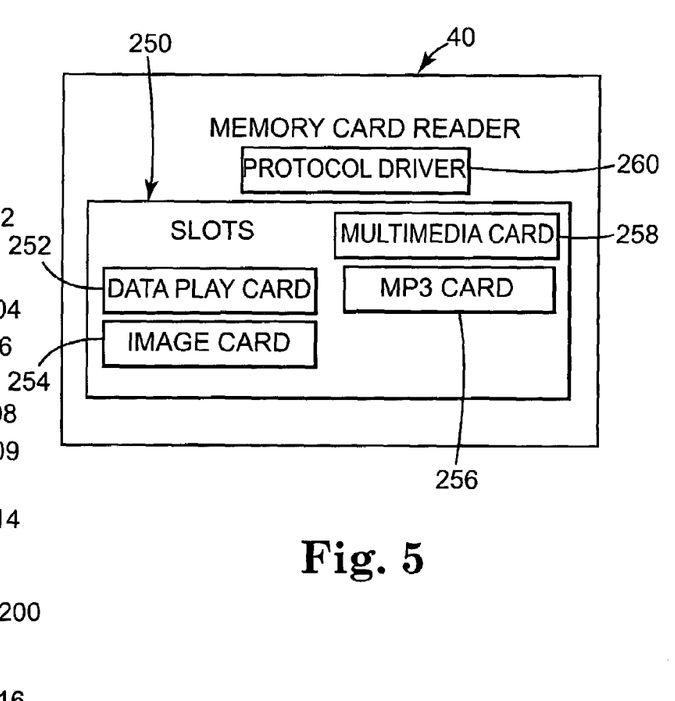
FIG. 5 is a block diagram of a memory card reader of a digital content terminal, according to an embodiment of the present invention.

FIG. 5 illustrates memory card reader 40 of digital content transfer appliance 12 which includes slots module 250 comprising DataPlay® card slot 252, image card slot 254, audio card slot 256, and multimedia card slot 258. Slots module 250 includes a plurality of differently sized and shaped slots for receiving a variety of memory cards so that digital content transfer appliance 12 can be used for transferring audio, photo, video, and multimedia digital content to and from a memory card. Each of the different slots, e.g., DataPlay® card slot 252, image card slot 254, audio card slot 256, include all available communication and storage protocols (e.g., Personal Computer Memory Card International Association (PCMCIA)) for the various types of digital content.

Memory card reader 40 optionally includes a protocol driver 260 that is updatable for providing slot module 250 of memory card reader 40 with the latest communication and storage protocols used with memory cards 20 so that memory card reader 40 is capable of handling all formats and protocols of memory cards 20.

Figure 6:
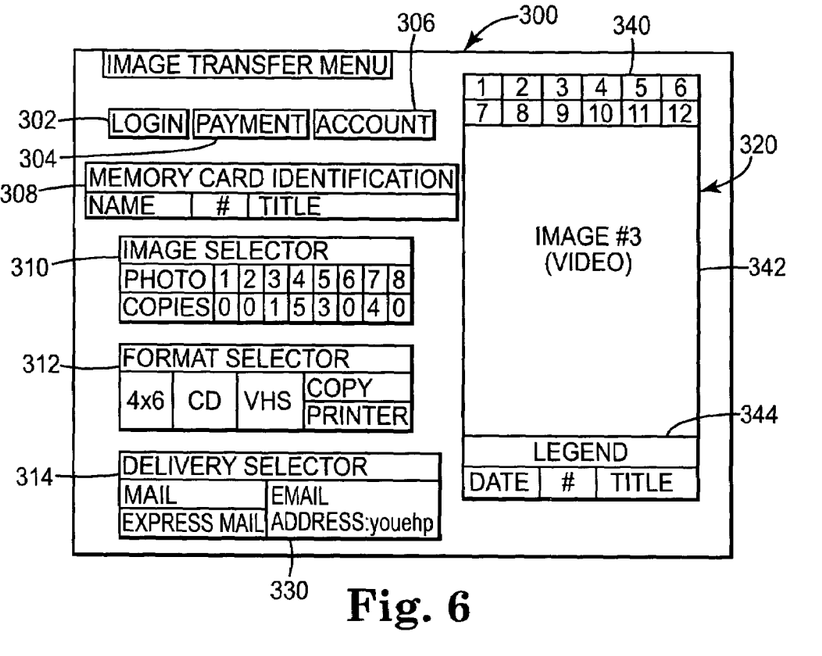
FIG. 6 is a block diagram of an image transfer menu, according to an embodiment of the present invention.

As shown in FIG. 6, display 60 of user interface 48 optionally includes interactive image transfer menu 300. Image transfer menu 300 is provided by digital service provider 14 through controller 44 and is operable locally through keypad 62, remote control 50, and/or display 60 acting as a touchscreen pointing device. As shown in FIG. 6, image transfer menu 300 includes login function 302, payment function 304, account function 306, memory card identification 308, image selector 310, format selector 312, delivery selector 314 with email function 330, and image gallery 320. Image gallery 320 includes image index 340, primary image 342, and image legend 344.

Login function 302, payment function 304, and account function 306 of image transfer menu 300 enable a customer to log in to digital content transfer appliance 12 and/or digital content service provider 14, make payment for services, and to manage other account information. Memory card identification 308 displays and permits designating a unique identification of each memory card 20 in memory card reader 40 of digital content transfer appliance 12 by name, number, and/or title.

Image selector 310 of image transfer menu 300 displays and enables user selection of a number of copies for processing of each identified photo. Image selector 310 optionally is used to make selections for processing of videos or portions of videos (e.g., still frames, segments, etc.). Format selector 312 enables selection of a format into which the selected images will be processed, such as 4 by 6 inch prints, burned on a CD, placed on VHS tape, selection of copying the existing memory card format, and/or printing the images on printer 21. In addition, format selector 312 is updatable to include selection for any industry standard electronic medium including DVD and other media formats. Delivery selector 314 displays and enables user selection of the method of delivery of the processed images including standard mail, express mail, and electronic mail to an address identified in address function 330. Address function 330 enables identification of an electronic mail address to which selected images can be sent from digital content transfer appliance 12 via modem 42 or from which images can be received at digital content transfer appliance 12 via modem 42. Upon entry of an electronic mail address, activating address function 330 on display 60 (using remote control 50 or touchscreen capabilities of display 60) activates sending or receiving electronic mail with the designated address. Address function 330 optionally can link to, or includes, an electronic mail program for composing textual messages to accompany the transferred images and/or for reading textual messages received with images sent by another user.

Image gallery 320 displays all of the images stored on memory card 20, available from digital content service provider 14, and/or memory 46 of digital content transfer appliance 12. Image index 340 displays a numerical or graphical thumbnail index of all of the images on memory card 20 and optionally from memory 46, and/or digital content service provider 14. Primary image 342 displays an image currently selected for viewing while legend 344 specifies a date, number, and/or title of primary image 342. When multiple memory cards 20 are present within memory card reader 40 of digital content transfer appliance 12, then image gallery 320 is optionally adapted to include image indexing and legends for images from more than one memory card. Moreover, any one of the components of image transfer menu 300 are selectively expandable or shrinkable on display 60 to enhance or minimize use of any one of the components as desired by the user.

Figure 7:
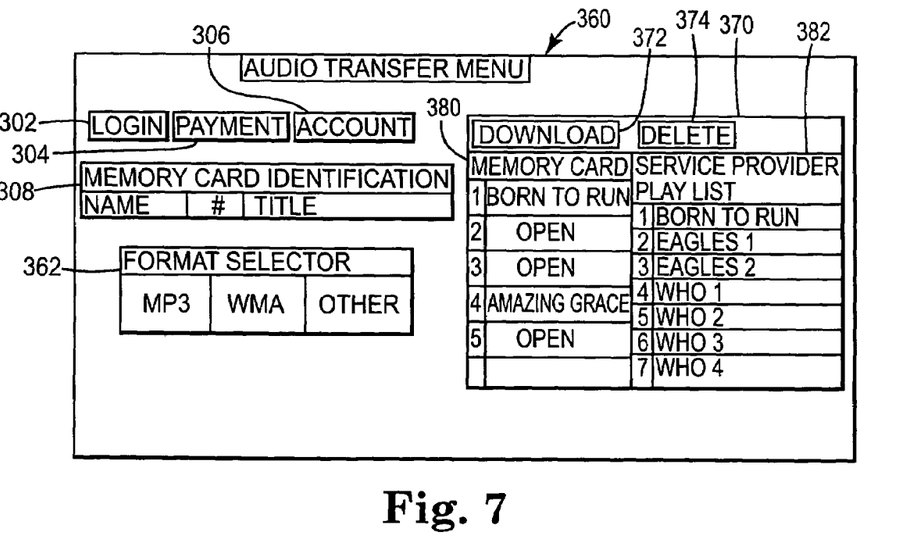
FIG. 7 is a block diagram of an audio transfer menu, according to an embodiment of the present invention.

As shown in FIG. 7, display 60 of user interface 48 optionally includes an interactive audio transfer menu 360. Audio transfer menu 360 is provided by digital service provider 14 through controller 44 and is locally operable through keypad 62, remote control 50, and/or display 60 acting as a touch-screen pointing device. Audio transfer menu 360 includes login function 302, payment function 304, and account function 306, memory card identification 308, format selector 362, and selectable audio file gallery 370. Audio file gallery 370 includes download function 372, delete function 374, memory card file list 380 and selectable audio service provider list 382. Login, payment, and account functions 302-306, and memory card identification 308 have substantially the same attributes and features as previously described in association with FIG. 6.

Format selector 362 permits selection of an audio file format such as MP3, WMA, etc in which an audio file will be downloaded onto memory card 20 or sent to digital content service provider 14. Audio gallery 370 provides a selectable audio file list 382 from digital content service provider 14 from which the user can select an audio file for downloading onto memory card 20 by highlighting a selection from service provider audio list 382 and activating download function 372. Audio files currently on memory card 20 and/or downloaded onto memory card 20 are shown in memory card audio list 380. Delete function 374 is used to delete and/or overwrite audio files on memory card 20 by highlighting a listed audio file in memory card audio list 382 and activating delete function 374.

User interface 48 is manipulable to display both audio transfer menu 360 and image transfer menu 300, or any portion thereof, simultaneously, on display 60 and/or media player 16 (such as a television) to suit the convenience of the user. Remote control 50 preferably is used to control and activate all of the functions of image transfer menu 300 and/or audio transfer menu 360 on display 60 of user interface 48 of digital content transfer appliance 12. Display 60 can appear on digital content transfer appliance 12 or on media player 16, such as a television, DVD player, personal digital assistant, etc.

Embodiments of the present invention for transferring digital content offer a number of advantages. Digital content transfer appliance embodiments of the present invention act as a stand-alone memory card appliance, which operates independent of a personal computer, for transferring digital audio files and/or digital image files to and from a memory card relative to a digital service provider or second memory card appliance. This memory card appliance stands independent from a personal computer and is capable of transferring all types of media (audio (e.g., MP3), video (e.g., VHS), photo, multimedia (e.g., DVD), etc.) to and from several types of memory cards. Embodiments reduce the expense and inconvenience associated with more complicated memory card transfers that are conventionally performed with a personal computer.

What is claimed is:

1. A digital content transfer system comprising:
a rewritable audio memory card defining a memory device independent of, and separate from, a media player and being configured to store at least one portable audio file; and
a transfer appliance including:
a memory card reader configured to removably receive, via slidable insertion, the rewritable audio memory card, wherein the memory card reader is configured to read the at least one portable audio file from the rewritable audio memory card and configured to write the at least one portable audio file into the rewritable audio memory card;
a controller configured to direct user-initiated transfer of the at least one portable audio file, via a network communication link and independent of a personal computer, between an internet-located digital content service provider and the memory card reader, wherein the user-initiated transfer includes: (1) selectively sending the at least one portable audio file from the rewritable audio memory card directly to the internet-located digital content service provider and (2) selectively receiving the at least one portable audio file into the rewritable audio memory card directly from the internet-located digital content service provider; and
an interactive graphical display configured to display information regarding the at least one portable audio file and configured to direct_transfer of the at least one portable audio file via activatable functions on the display, the interactive graphical display including:
an audio file selector configured to enable selection of the at least one portable audio file from plurality of portable audio files accessible at the internet-located digital content service provider for transfer from the internet-located digital content service provider directly into the rewritable audio memory card.

2. The digital content transfer system of claim 1 wherein the memory card reader comprises:
a protocol driver configured to cooperate with the controller to facilitate reading and writing of the at least one portable audio_file on the rewritable audio memory card in a plurality of storage formats.

3. The digital content transfer_system of claim 1 wherein the controller is configured to simultaneously transfer a digital image file and the at least one portable audio file from the internet-located digital content service provider to a rewritable image memory card and the rewritable audio memory card, respectively.

4. The digital content transfer system of claim 1 wherein the memory card reader is configured to receive an image memory card, wherein the controller is configured to transfer a digital image file from the internet-located digital content service provider to the memory card reader, and wherein the user interface comprises:
an image memory card identifier configured to identify at least of a name, a title, and a number of the image memory card;

an image selector configured to select at least one image file of a plurality of image files for processing from the digital content service provider for transfer to the image memory card;
a format selector configured to select a format for processing;
a delivery selector configured to select a method of delivery of the processed digital image files; and
an image gallery configured to enable viewing the digital image files.

5. The digital content transfer system of claim 1 and further comprising:
a network communication link configured to establish communication between the modem of the digital content transfer system and the internet-located digital content service provider; and
a media player connected to the network communication link and configured to generate a graphical user interface of the digital content transfer system with portable audio file selections offered by the internet-located digital content service provider, and configured to play the at least one portable audio file stored in the rewritable audio memory card.

6. The digital content transfer system of claim 5 wherein the internet-located digital content service provider comprises:
a web site configured to download the at least one portable audio file directly, via the modem, to the rewritable audio memory card that is removably, slidably inserted within the memory card reader of the digital content transfer system.

7. The digital content transfer system of claim 1 wherein the at least one portable audio file comprises at least one of a MP3 file and a WMA file.

8. A method of transferring a portable music file independent of a personal computer, the method comprising:
removably, slidably inserting into a single stand-alone appliance, independent of the personal computer, a plurality of rewritable memory cards including at least one of a rewritable music memory card and a rewritable multimedia memory card, wherein each respective rewritable memory card defines a memory device independent of, and separate from, a media player;
providing bidirectional transfer, via the single stand-alone appliance independent of the personal computer and via an internet communication link, of the portable music file directly between an internet-located digital content service provider and at least one of the respective rewritable memory cards; and
selectively operating the single stand-alone appliance in one of:
a first mode including downloading the portable music file from the internet-located digital content service provider into at least one of the respective rewritable memory cards; or
a second mode including transmitting the portable music file from at least one of the respective rewritable memory cards to the internet-located digital content service provider.

9. The method of claim 8 wherein removably inserting the plurality of memory cards comprises removably inserting into the single stand-alone appliance at least one of a still photo memory card and a video memory card, and further comprising writing a digital image file, via the single stand-alone appliance, into the still photo memory card or video memory card directly from the internet-located digital content service provider, wherein the digital image file includes still photo images and video images.

10. The method of claim 8 further comprising:
storing the portable music file in a memory of the single stand-alone appliance.

11. The method of claim 8 wherein during operation in the first mode, receiving the portable music file, via the internet communication link and via the single stand-alone appliance, comprises:
performing a download function via one-touch activation of the single stand-alone appliance, by using pre-defined download settings without otherwise accessing a user interface of the single stand-alone appliance, to cause transfer of the portable music file from the internet-located digital content service provider to the single stand-alone appliance.

12. The method of claim 8 wherein removably inserting the plurality of memory cards comprises simultaneously retaining in the single stand-alone appliance each of the music memory card, an image memory card, and a multimedia memory card.

13. The method of claim 8 wherein the portable music file comprises at least one of a MP3 file and a WMA file.

14. The method of claim 8 wherein writing the portable music file directly from the rewritable memory cards, via the internet communication link and via the single stand-alone appliance, comprises:
performing a transmit function via one-touch activation of the single stand-alone appliance, by using predefined transmit settings without otherwise accessing a user interface of the single stand-alone appliance, to cause transfer of the portable music file from the single stand-alone appliance to the internet-located digital content service provider.

* * * * *

UNITED STATES PATENT AND TRADEMARK OFFICE
CERTIFICATE OF CORRECTION

| | | |
|---|---|---|
| PATENT NO. | : 7,487,226 B2 | Page 1 of 1 |
| APPLICATION NO. | : 10/632071 | |
| DATED | : February 3, 2009 | |
| INVENTOR(S) | : Barbara Alaine Blair et al. | |

It is certified that error appears in the above-identified patent and that said Letters Patent is hereby corrected as shown below:

In column 3, line 61, delete "modern" and insert -- modem --, therefor.

In column 10, line 31, in Claim 1, delete "provider" and insert -- provider; --, therefor.

In column 10, line 37, in Claim 1, delete "direct_transfer" and insert -- direct transfer --, therefor.

In column 10, line 51, in Claim 2, delete "audio_file" and insert -- audio file --, therefor.

In column 10, line 53, in Claim 3, delete "transfer_system" and insert -- transfer system --, therefor.

Signed and Sealed this

First Day of September, 2009

David J. Kappos
*Director of the United States Patent and Trademark Office*